Nov. 14, 1944.  L. A. DE ROSA  2,362,470
ARTIFICIAL LINE AND METHOD OF MAKING SAME
Filed Aug. 8, 1942  2 Sheets-Sheet 1
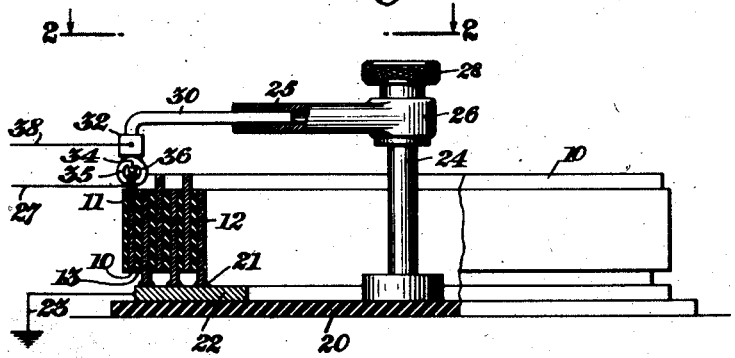
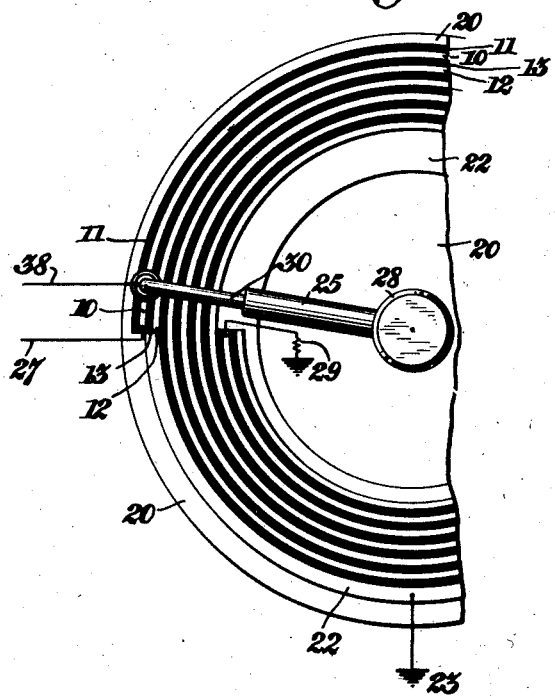
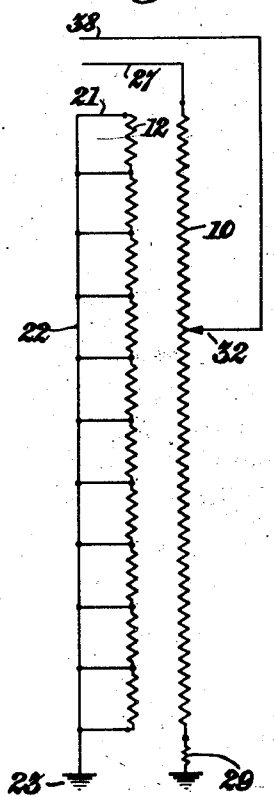
INVENTOR
LOUIS A. DEROSA
BY
ATTORNEY Nov. 14, 1944.   L. A. DE ROSA   2,362,470
ARTIFICIAL LINE AND METHOD OF MAKING SAME
Filed Aug. 8, 1942   2 Sheets-Sheet 2

INVENTOR
LOUIS A. DE ROSA
BY
ATTORNEY

Patented Nov. 14, 1944

2,362,470

UNITED STATES PATENT OFFICE 2,362,470

ARTIFICIAL LINE AND METHOD OF MAKING SAME

Louis A. De Rosa, Staten Island, N. Y., assignor to Federal Telephone and Radio Corporation, a corporation of Delaware Application August 8, 1942, Serial No. 454,198

15 Claims. (Cl. 178—45)

This invention relates to artificial lines and one of the objects of the invention is to provide an artificial line of high permeability having high inductance and high capacitance per unit length of line.

Another object of the invention is to provide an artificial line which is readily adjustable with respect to the inductance and capacitance thereof.

Still another object of the invention is to provide a method for manufacturing an artificial line having high inductance and high capacity per unit length of line.

A further object of the invention is to provide an artificial line including high permeability material and having substantially evenly distributed capacitance and inductance throughout the effective length thereof.

Low electrical resisting nickel-iron alloys in the region close to 50% nickel and in the region near 80% nickel with or without small additions of other ingredients such as copper, chromium and molybdenum, and known generally as Permalloy, have exceptionally high permeability but are very sensitive to mechanical abuse, that is to say, the permeability of the alloy is diminished sharply when the alloy is subjected to stress. Thus should Permalloy be formed into wire and the wire coiled, the coiling thereof subjects the inner surface portions of the coiled wire to compression and the outer surface portions to tension and these stresses sharply diminish the permeability characteristics of the wire.

In accordance with my invention, I have discovered a method of making an artificial line utilizing nickel-iron alloy as a high permeability conductor with substantially no stress imposed upon the alloy. Furthermore, the manner in which I use the alloy provides an artificial line having a high inductance and high capacity per unit length of line, and the inductance and capacitance are substantially evenly distributed throughout the effective length thereof.

These features I accomplish by using or initially making the nickel-iron alloy in the form of thin sheets or ribbonlike strips. In this thin strip form the thinness of the material permits it, if desired, to be curved or even coiled on to itself without introducing any substantial stress therein. The alloy, of course, may be used in straight form and as such will not be subjected to any mechanical stress. Whether the alloy is to be used straight or curved or coiled, I build up a laminated body comprising a strip of alloy, a strip of metal foil such as tin or copper and sandwich therewith one or two layers or strips of insulating material such as "condenser paper" having high dielectric properties. The laminated body may be curved or coiled in one or more turns, or it may be arranged in flat or cylindrical spiral form. The high permeability of alloy provides high inductance and the lamination of the alloy with metal foil and insulating material provides high capacity for the line.

Where the curvature of the laminated body is sufficiently sharp to introduce objectionable stress in the thin Permalloy sheet, the coiled or spiraled material may then be subjected to a stress-relieving heat treatment known as "hydrogen anneal process."

The artificial line may be made variable by providing a terminal contact movable along the length of the nickel-iron alloy strip. The metal foil is suitably grounded along the length thereof and the free end of the alloy is preferably grounded through a resistance equal to the surge impedance of the line. To provide for equal distribution of inductance and capacitance for the laminated line, the strips of alloy and insulation may be varied in thickness in opposite directions crosswise of the line. That is to say, the thickness of the alloy may be tapered from one side edge to the other and the strip of insulation tapered similarly but in the opposite direction.

For a further understanding of the invention reference may be had to the following detailed description to be read in connection with the accompanying drawings, in which Fig. 1 is a view in vertical elevation with a part thereof in section showing one form of artificial line in according with this invention;

Fig. 2 is a fragmentary plan view of the artificial line taken substantially along line 2—2 of Fig. 1;

Fig. 3 is a schematic illustration of the form shown in Figs. 1 and 2 showing the electrical circuit of the line.

Figure 4:
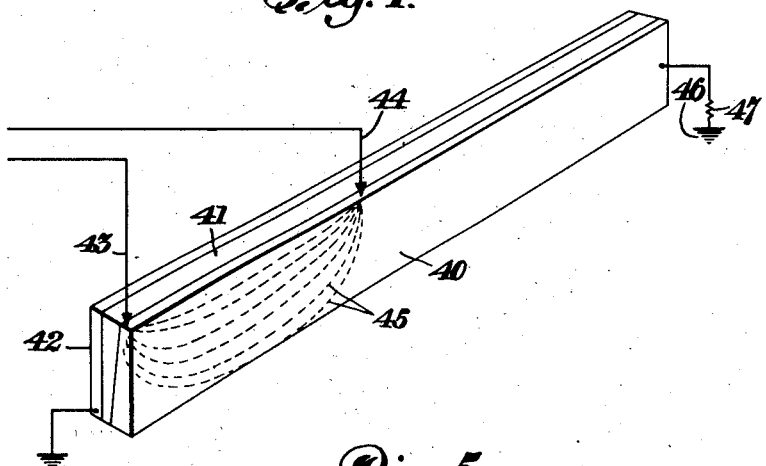
Fig. 4 is a view in perspective of another form of the invention.

Referring to Figs. 1, 2 and 3 of the drawings, a laminated body is shown, in accordance with one form of the invention, made up of four ribbonlike strips of material coiled on to itself. The laminated body comprises one strip 10 of high permeability material, a second strip 12 of metal foil and two strips of insulating material 11 and 13, the strip 11 being disposed on one side of the high permeability material 10 and the strip 13 being disposed between the sheets 10 and 12. The strip 10 may comprise any suitable high permeability material and as hereinbefore suggested, I preferably use a form of Permalloy in the regions close to 50% or 80% nickel. The strip of Permalloy is preferably thin, about .015 inch more or less, so that when it is curved in circular or coiled form having a diameter several hundred times the thickness of the Permalloy no appreciable stress will be imposed thereon. The thin metal foil 12 may be either tin, copper, aluminum, or any other suitable conductive material, and may be of foil thickness from about .01 to .015 inch. The insulating sheets 11 and 13 may comprise any suitable form of insulating paper such as condenser paper about .002 inch thick or may comprise a coating or layer of other suitable substance having a high dielectric constant.

The laminations of Permalloy, metal foil and insulating material are arranged in a staggered relation, that is to say, one edge portion of the Permalloy strip is exposed beyond the edge portions of the insulating and metal foil strips while the opposite edge portion of the metal foil is extended beyond the adjacent edge portions of the insulating and Permalloy strip materials. This staggering of the Permalloy and metal strips render it easy to provide terminal connections therefor. The laminated body may be curved into circular form or the body may be coiled so that the strips thereof form several turns. As shown in Fig. 2, the laminated body is coiled so as to provide approximately three turns.

The body thus coiled may be suitably mounted on a support 20 having an annular base element 22 onto which the extended edge portions of the metal foil 12 may rest and be secured thereto by solder 21 or other suitable means. The annular base element 22 is grounded as indicated at 23. One end of the Permalloy strip is connected to a lead 27 and the other end of the strip is connected to ground through a resistance 29 equal to the surge impedance of the line.

The base 20 is provided with a central standard 24 to rotatably support at the upper end thereof a hub 26 carrying an arm 25. Atttached to the hub portion 26 is a handle 28 by which the arm 25 may be moved about the axis of the standard 24. The arm 25 is made tubular to telescopingly receive a rod-shaped member 30, the outer end of which has mounted thereon a member 32 adapted to slidably contact the upper edge portion of the Permalloy sheet 10. The sliding member 32 is provided with three contact portions, a central portion 34 to engage the top edge of the sheet 10 and two resilient side portions 35 and 36 to engage the opposite sides of the sheet adjacent the top edge thereof. When the handle 28 is turned, a contact element 32 is moved along the edge portion of the strip material. The element 32 may be connected to a lead 38 or any other terminal arrangement desired may be provided such as a brush and ring arrangement on the standard 24. The telescoping feature of the arms 25 and 30 compensates for the spiral arrangement of the coiled permalloy strip, the arm being varied in length as the arm is moved about the axis of the standard 24.

It will be understood that the laminated material need not be coiled in overlapping relation as shown in Figs. 1 and 2 but may be curved into a substantially cylindrical form and a manually adjustable sliding contact may be provided for varying the effective length of the line similarly as shown in Figs. 1 and 2 except that the arm need not be variable in length.

In Fig. 3 the circuit of the line is diagrammatically illustrated showing the ground and terminal connections of the strips 10 and 12. The reference here to "ground" is intended to be regarded merely as a base potential, it being clear that the resistor 29 provides the desired minimum difference in potential between the strip 10 and such base potential.

Referring to Fig. 4 of the drawings, another form of the invention is shown made up of straight strips. These strips may be of uniform thickness but as shown, I have chosen certain of these strips to be tapered from one side edge to the other. The strip of Permalloy 40 and the strip or layer of insulating material 41 are tapered while the strip of grounded metal 42 is of uniform thickness. The directions of the taper of the Permalloy strip and of the insulating strip are arranged in opposed relation, that is to say, the thicker portion of the Permalloy is disposed adjacent the thinner portion of the insulating strip and the thicker portion of the insulating strip is disposed adjacent the thinner portion fo the Permalloy strip. This disposition of the two strips improves the distribution of current through the area of the Permalloy strip between the terminals 43 and 44, the terminal 43 being located at one end of the Permalloy strip 40 adjacent the thinner edge portion thereof and the terminal 44 being movably adjustable along the same thin edge portion. This also improves the distribution of electrostatic lines of force throughout the effective surface area of the Permalloy strip.

By tapering the Permalloy strip from one side edge portion to the other, the conductivity of those portions of the strip extending further and further to one side of the shortest paths between the two terminals 43 and 44 is progressively increased. Thus, when a voltage is applied across the terminals 43 and 44 the current, instead of flowing along the thin edge portion thereof, will be distributed substantially equally across the width of the strip as indicated by the broken lines 45.

Since the Permalloy has high permeability, the distribution of current throughout the width of the strip results in an equal distribution of flux throughout the width of the strip so that the inductance of the strip is substantially equally distributed. The tapering of the insulating strip 41 assists in the distribution of the lines of current 45 since the greater thickness thereof avoids unequal leakage adjacent the terminals and along the shortest path between the terminals 43 and 44. As a result of the tapering of these two strips, the capacitance of the line is substantially equally distributed throughout the area of the strips disposed between the two terminals. The free end of the Permalloy strip 40 is grounded at 46 through a suitable resistance 47 equal to the surge impedance of the line. Where the Permalloy line extends a substantial length beyond the range of the movable contact 44, the resistance 47 may be omitted. This is also true in the case of the resistances 29 and 65 in the forms shown in Figs. 2 and 5.

It should be clear that the tapered strip arrangement of Fig. 4 may be used in other forms of my invention. The strips shown in Figs. 1 2 and 3 may be of this particular tapered shape if desired, with the resulting advantages. In fact, the particular principle may be applied to any form of structure embodying my invention.

Figure 5:
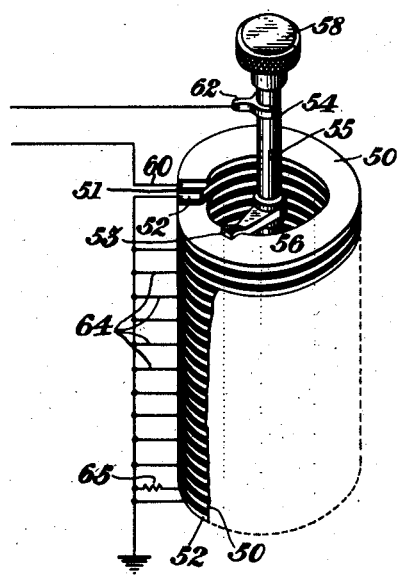
Fig. 5 is a view in perspective of still another form of the invention.

A compact form of a long artificial line is shown in Fig. 5. In this form, the Permalloy strip 50 may be initially extruded in a flat ribbonlike strip and caused to build up in a spiral shape. The strips 51 of insulation and 52 of metal foil may be similarly formed and fed in laminating relation with the Permalloy strip 50. The spiraling of the strips 50, 51, 52, however, may be performed in other ways and should the spiraling impose mechanical stress in the Permalloy strip 50, the spiraled strip may be subjected to a suitable stress relieving heat treatment such as the "hydrogen anneal process."

The lamination of the strips is preferably such as to provide for an inwardly protruding or exposed edge portion of the Permalloy strip so that a brush 53 carried on a shaft 54 will have sliding engagement herewith. The shaft 54 is disposed axially of the spiral and is provided with a spline 55 to accommodate a key carried by the hub 56 which supports the brush 53. The shaft may be rotated by a suitable insulated handle 58 secured to one end of the shaft.

One end of the Permalloy may be provided with a terminal 60 while the other terminal for the line may be provided by a brush 62 having contact with the shaft 54. Thus, a circuit will be provided between terminals 60 and 62 leading through the shaft 54, the hub 56 and the brush 53 to the Permalloy strip. As the handle 58 is revolved the brush is moved along the edge of the Permalloy strip, the Permalloy strip determining the axial movement of the brush relative to the shaft.

It will be understood, however, that forms other than that described above may be provided to control the movement of the brush 53 axially of the coil and in sliding contact with the spiral Permalloy strip. For example, a suitable threaded arrangement may be provided to effect the axial and rotary movement of the brush 62.

The metal foil 52 is preferably grounded at several points along the length thereof as indicated by the ground connections 64. The free end of the Permalloy strip 50 is grounded through a suitable resistance 65. The circuit for this form is the same as illustrated in Fig. 3.

From the foregoing, it is clear that in accordance with my invention, an artificial line may be provided having exceptionally high capacity and inductance evenly distributed throughout its length, and that the phase or delay characteristic of the line may be varied as desired by adjusting the relative positions of the input and output terminals thereof. As a result of this adjustment the distance between these terminals, and therefore the effective amount of inductance and capacity introduced into the circuit, may be changed to any suitable degree.

It is recognized that many variations in the structure, the means for supporting the laminated body and the method of manufacturing the attenuating line are possible without departing from the invention. For example, a wear-resisting element may be disposed along the edge portion of the Permalloy strip against which the contact element 32, 44 or 53 may be moved. Also, any suitable frame or housing structure may be added to support and hold the laminated body in a desired position. The dimensions and shapes of the laminated strips may also be widely varied without departing from the invention. It will be understood, therefore, that the forms and the method herein shown and described are to be regarded as illustrative of the invention only and not as restricting the appended claims.

What is claimed is:

1. An artificial line comprising a laminated body including strips of high permeability material, conducting material, and insulating material, the strip of insulating material being interposed between the strips of the other two materials, said strip of conducting material being grounded, and the strip of high permeability material having means connectable in a circuit at spaced points therealong.

2. The artificial line as defined in claim 1, wherein the strip of high permeability material comprises Permalloy.

3. The artificial line as defined in claim 1, wherein the strips forming the laminated body are substantially straight.

4. The artificial line as defined in claim 1, wherein the laminated body is coiled to form a compact device.

5. The artificial line as defined in claim 1, wherein the strip of high permeability material is tapered from one side edge to the other side edge thereof and the connectable means are provided adjacent the thinner side edge of such strip.

6. The artificial line as defined in claim 1, wherein the strip of high permeability material is tapered from one side edge to the other side edge thereof and the connectable means are provided adjacent the thinner side edge of such strip, the strip of insulating material is tapered from one side edge thereof to the other side edge thereof, and the tapering of the two strips are disposed in opposite directions.

7. An artificial line comprising a laminated body including strips of high permeability material, metal foil and insulating material, the insulating strip being interposed between the other strips to provide capacity for the line, said body being curved, said strip of high permeability providing inductance for the line, and means movable in conductive relation with respect to the strip of high permeability material, whereby the capacity and inductance of the line may be varied.

8. An artificial line comprising a coiled laminated body formed of a strip of Permalloy, a strip of metal foil, and a strip of insulating material, and the strip of Permalloy being made thin so that the curvature thereof due to the coiled arrangement of the Permalloy imposes a minimum of stress therein.

9. An artificial line comprising thin strips of high permeability material, metal foil and insulating material, the strips of high permeability material and metal foil being coiled together in spiral form with the strip of insulating material interposed therebetween, and terminal means movable along the length of and having conductive engagement with the strip of high permeability material.

10. The artificial line as defined in claim 9 wherein the spiraling of the strips discloses the strip of high permeability material progressively further from the axis of the spiral and the terminal means comprises a revolvable arm automatically adjustable in length as it is rotated so as to maintain engaging contact with the strip of high permeability material.

11. The artificial line as defined in claim 9, wherein the spiraling of the strips disposes the strips in the form of a cylinder and the terminal means comprises a revolvable arm movable axially of said cylinder as it is revolved so that it is adapted to move in engagement with said strip along the length thereof.

12. A method of making an artificial line comprising forming a substance having a high permeability such as Permalloy into a strip of such thinness that curvature imposed thereon will produce therein a minimum of stress only, adding to said permeable strip a strip of metal foil and a strip of insulating material to form a laminated body, the strip of insulating material being interposed between the permeable strip and the strip of metal foil, and then coiling the laminated body to provide a compact arrangement.

13. A method of making an artificial line comprising forming a substance having a high permeability such as Permalloy into a strip, adding to said permeable strip a strip of metal foil and a strip of insulating material to form a laminated body, the strip of insulating material being interposed between the permeable strip and the strip of metal foil, coiling the laminated body to provide a compact arrangement, and subjecting the coiled body to a heat treatment to relieve any stress that might be produced in the permeable substance by the coiling operation.

14. A method of making an artificial line comprising forming a substance such as Permalloy into a strip tapered in thickness from one side edge to the other side edge thereof, laminating therewith a layer of insulating material and a strip of metal, the insulating material being interposed between the permeable strip and the metal, and forming terminal connections for the permeable strip adjacent the thinner side edge portion thereof.

15. A method of making an artificial line comprising forming a substance having a high permeability such as Permalloy into a strip tapered in thickness from one side edge to the other side edge theref, forming a mass of insulating material into a tapered layer on one side of the permeable strip, the taper of the insulating material being disposed in a direction opposite to the taper of the permeable strip, and adding a strip of metal foil on the side of the insulating layer opposite said permeable strip.

LOUIS A. DE ROSA.